United States Patent [19]

Linder

[11] Patent Number: 5,046,472

[45] Date of Patent: Sep. 10, 1991

[54] APPARATUS FOR COMBINED BLOW-INJECTION OF FUEL AND AIR FOR FUEL INJECTION SYSTEMS OF INTERNAL COMBUSTION ENGINES

[75] Inventor: Ernst Linder, Muehlacker, Fed. Rep. of Germany

[73] Assignee: Robert Bosch GmbH, Stuttgart, Fed. Rep. of Germany

[21] Appl. No.: 482,602

[22] Filed: Feb. 21, 1990

[30] Foreign Application Priority Data

May 3, 1989 [DE] Fed. Rep. of Germany ....... 3914636

[51] Int. Cl.⁵ .......................................... F02M 39/00
[52] U.S. Cl. .................................. 123/533; 239/585; 239/408; 239/409
[58] Field of Search ............... 123/531, 532, 533, 534; 239/408, 409, 410, 411, 585, 549

[56] References Cited

U.S. PATENT DOCUMENTS

| | | | |
|---|---|---|---|
| 1,431,473 | 10/1922 | Lovejoy | 239/408 |
| 1,793,154 | 2/1931 | Bellem et al. | 239/410 |
| 4,046,112 | 9/1977 | Deckard | 123/531 |
| 4,406,404 | 9/1983 | Horino et al. | 123/532 |
| 4,546,739 | 10/1985 | Nakajima | 239/585 |
| 4,836,453 | 6/1989 | Poehlman | 239/585 |
| 4,917,307 | 4/1990 | Baxter et al. | 239/585 |

FOREIGN PATENT DOCUMENTS

WO86/00960 2/1986 PCT Int'l Appl. .
WO87/00579 1/1987 PCT Int'l Appl. .

Primary Examiner—Andrew M. Dolinar
Assistant Examiner—M. Macy

[57] ABSTRACT

An apparatus for the combined blow-injection of fuel and air for fuel injection systems of internal combustion engines having a housing with a fuel connection an air connection and a blow-injection opening communicating with the air and fuel connections. Two valves are disposed in the housing and simultaneously actuated by an electromagnet. Both valves are disposed concentrically with one another, directly at the blow-injection opening to make it possible for the mixing ratio to be determined solely by the opening duration of the valves by means of synchronously clocked metering of fuel and air. The valve seat of the air valve and the valve seat of the fuel valve are carried in common by a hollow shaft valve member actuated by the electromagnet. For valve opening, the valve member of the air valve lifts inwardly of the housing and the valve member of the fuel valve lifts outwardly, and a stroke stop is disposed in the stroke of the valve member of the fuel valve in such a way that the maximum stroke path of the hollow shaft valve member is longer than that of the valve member of the fuel valve.

21 Claims, 2 Drawing Sheets

APPARATUS FOR COMBINED BLOW-INJECTION OF FUEL AND AIR FOR FUEL INJECTION SYSTEMS OF INTERNAL COMBUSTION ENGINES

BACKGROUND OF THE INVENTION

The invention is based on an apparatus for the combined blow-injection of fuel and air for fuel injection systems of internal combustion engines.

Such blow-injection apparatuses are used for improved mixture preparation, by means of improved atomization of the fuel with a high relative speed between the fuel and air. Prior to entry into the combustion chamber of the engine, the fuel is intensively mixed with air. The fuel-air mixture can be blown both into the intake tube, leading to the engine cylinder, and directly into the cylinder itself.

In a blow-injection apparatus of this type (International Application WO 86/00960), two valves are disposed in line, in the axial direction of the housing, and a mixing chamber is formed between the two valves that communicates with the fuel connection. The inner valve controls the delivery of air into the mixing chamber, and the outer valve, embodied as a screen valve, controls the flow of the fuel-air mixture into the engine combustion chamber. The valve members of both valves are seated on a bar actuated by an electromagnet and are pressed onto the associated valve seats by a valve closing spring engaging the bar. Upon excitation of the magnet, both valves are opened simultaneously. As a result, air and fuel begin to flow into the mixing chamber at a ratio determined by the respective pressures and flow cross sections and flow on into the combustion chamber of the engine. As a result of the flow through the gap, the fuel is intensively mixed with the air. Metering of the quantity of fuel required per cycle is done by varying the fuel pressure in relation to the blow-injection air pressure. The metered fuel quantity is also dependent on the volume of the mixing chamber.

OBJECT AND SUMMARY OF THE INVENTION

The apparatus according to the invention for the combined blow-injection of fuel and air for fuel injection systems of internal combustion engines has an advantage that the separate admixture of fuel and air does not take place until the moment of the blow-injection, and a preceding mixing chamber is dispensed with. As a result, fuel and air can be metered with synchronous clocking, so that the mixing ratio is determined solely by the opening period of the valve. The supply pressure of the fuel and air can be kept constant. With lower air pressure, less air is required, so that smaller and less expensive air pumps can be used. With the omission of the mixing chamber, deposits on the inside of the apparatus, which occur when fuel is decomposed in air at unavoidable temperatures of over 180° C., are avoided. Over the long run, such deposits create contamination at the metering gap and cause a drift in the metering.

In a preferred embodiment of the invention, the valve seat of the air valve is embodied as an annular shoulder on an inner wall of a housing connector that includes the blow-injection opening, and the valve member of the fuel valve is supported by an axially displaceable valve needle passing through the hollow shaft. With the hollow shaft carrying the valve member of the air valve on the outside and the valve seat of the fuel valve on the inside, the air valve thus coaxially surrounds the fuel valve. This provides better thermal decoupling of the fuel valve from the environment.

In another embodiment of the invention, the air valve seat is disposed on the hollow shaft and the fuel valve member is disposed on the hollow shaft and are embodied as annular shoulders, inclined at approximately right angles to one another, on the outer and inner wall of the hollow shaft, respectively; the annular shoulders on the inner wall of the housing connector and on the closing head of the valve needle are inclined by approximately 45° with respect to the housing axis. This assures that the air stream and the fuel stream will emerge at right angles to one another from the respective associated valves, which additionally improves atomization of the fuel by the air flow.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
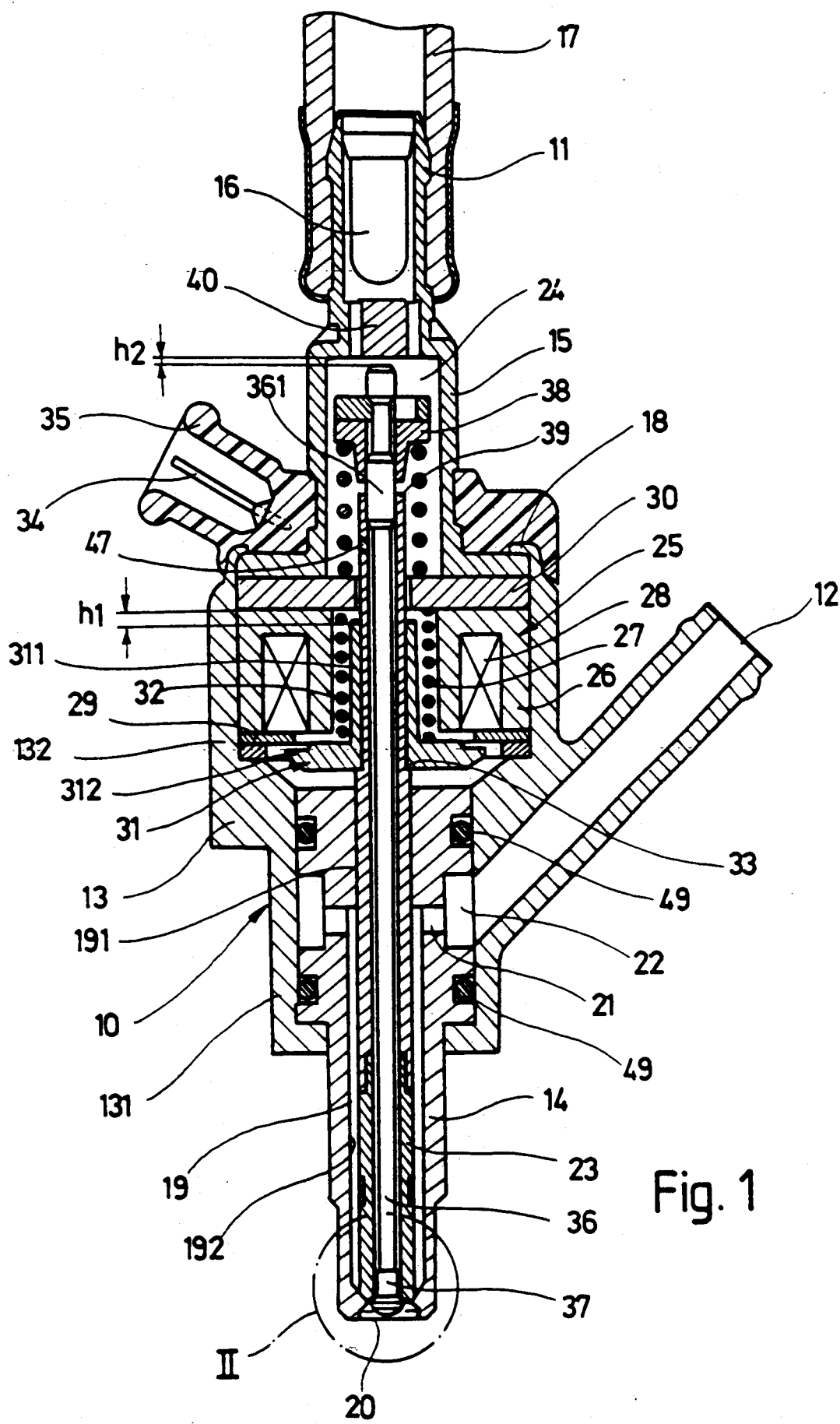
FIG. 1 shows a longitudinal section of a blow-injection apparatus for a fuel injection system in internal combustion engines.

In FIG. 1, the apparatus for combined blow-injection of fuel and air for fuel injection systems of internal combustion engines is shown in longitudinal section. It is suitable both for blow-injection of the fuel-air mixture into the intake tube of a cylinder of the engine and for direct injection into the cylinder of the engine. The apparatus has a housing 10 with a fuel connection 11 and an air connection 12. The housing 10 is embodied in three parts and has a hollow middle part 13, with different inside diameters, that integrally includes the air connection 12, a housing connector 14 that protrudes from the housing 10 on the face end of the section 131 of the middle part having the smaller diameter, and a cap part 15 of T-shaped cross section, which covers the middle part 13 at the face end of the section 132 of the middle part having the larger diameter and integrally contains the fuel connection 11 that is integral with the housing axis 50. The center part of the cap part 15 is hollow and is closed off in the region of the fuel connection 11 with a fuel filter 16. A fuel supply line 17 is slipped onto the fuel connection 11. The cap part 15 is retained on the middle part 13 by an internal bead 18.

The housing connector 14 is provided with a coaxial graduated through bore 19, which forms the blow-injection opening 20 of the apparatus at the free face end of the housing connector 14. In the vicinity of the bore section 192 of larger diameter, the through bore 19 communicates via radial bores 21 with a circumferential groove 22 on the housing connector 14, in which groove the air connection 12 discharges. The housing connector 14 is sealed off in an air-tight manner from the inner wall of the section 131 of the middle part having the smaller diameter by O-rings 49 on both sides of the circumferential groove 22. The through bore 19 is penetrated by a hollow shaft 23 that is axially displaceably guided in the region of the bore section 191 of smaller diameter and protrudes as far as the inside of the fuel-filled interior 24 of the center part of the cap part 15. There, the interior of the hollow shaft 23 communicates with the interior 24 via inflow bores 47. The hollow shaft 23 can be axially displaced by means of an electromagnet 25. The electromagnet 25, of known design, comprises a magnet cup 26 with a hollow cup core 27 and a magnet coil 28, located in the annular space between the magnet cup 26 and the cup core 27. The magnet cup 26 is covered with a disk 29 on one end that overlaps the magnet coil 28 and is fastened along with this disk and a support plate 30 that it rests on the transverse part of the cap part 15, in the section 131 of the middle part of the housing 10. A mushroom-shaped armature 31 rests with its cylindrical part 311 on the hollow shaft 23 and with its head part 312 overlaps the disk 29. A first valve closing spring 32 supported on the support plate 30 and on the head part 312 of the armature 31 presses the armature against an annular stop shoulder 33 on the hollow shaft 23.

The magnet coil 28 of the electromagnet 25 is connected to the plug contacts 34 of a plug 35, which is embodied as a plastic part and is secured to the cap part 15, surrounding its center part. Upon excitation of the magnet coil 28, the armature 31 executes an upward stroke h1.

A valve needle 36 penetrates the interior of the hollow shaft 23, and on its face end oriented toward the blow-injection opening 20 it has a closing head 37. With a guide section 361 of enlarged diameter near its upper end, the valve needle 36 is axially displaceably guided in the end region located downstream of the inflow bore 47 of the hollow shaft 23. On the upper end of the valve needle 36 that protrudes from the hollow shaft 23, a spring plate 38 is retained. Supported between the spring plate 38 and the support plate 30 structurally connected to the housing is a second valve closing spring 39, the force direction of which is opposite that of the first valve closing spring 32. The face end of the valve needle 36 is located at a distance h2 in front of a stop 40 in the interior 24 of the cap part 15, so that the maximum stroke which the valve needle 36 can execute, is the stroke h2.

As can be seen from the enlarged view of FIG. 2, the housing connector 14, hollow shaft 23 and valve needle 36 with its closing head 37 form two valves concentrically disposed directly at the blow-injection opening 20, of which the outer valve, hereinafter called the air valve 41, is disposed in the communication between the blow-injection opening 20 and the air connection 12, while the inner valve, hereinafter the fuel valve 42, is disposed in the communication between the blow-injection opening 20 and the fuel connection 11. Each valve 41, 42 has a valve seat and a valve member cooperating with it. The valve seat of the air valve 41 is embodied by an annular conical shoulder 43 on the inner wall of the housing connector 14, and this shoulder extends at an angle of approximately 45° with respect to the housing axis 50. The valve member of the air valve 41 that cooperates with this annular shoulder 43 is formed by an annular conical shoulder 44, likewise extending at an angle of approximately 45°, on the face end of the hollow shaft 23; this shoulder 44 extends from approximately the middle of the face end toward the outer wall of the hollow shaft 23. A second annular shoulder 45, extends approximately perpendicular to the annular shoulder 44, on the face end of the hollow shaft 23 and extends from approximately the middle of the face end to the inner wall of the hollow shaft 23. The shoulder 45 forms the valve seat of the fuel valve 42. The valve member of the fuel valve 42 cooperates with this valve seat and is embodied as a rearward annular shoulder 46 on the closing head 37 of the valve needle 36 and again extends at an angle of approximately 45° relative to the housing axis 50. By means of the first valve closing spring 32, the annular shoulder 44 on the hollow shaft 23 is pressed onto the annular shoulder 43 on the housing connector 14 and the air valve 41 is thereby kept closed. By means of the second valve closing spring 39, the valve needle 36 is pulled with its annular shoulder 46 against the annular shoulder 45 on the hollow shaft 23, and the fuel valve 42 is thereby kept closed. For opening the fuel valve 42, the annular shoulder 46 on the closing head 37 lifts outwardly away from the annular shoulder 45 on the hollow shaft 23, and for opening the air valve 41 the annular shoulder 44 on the hollow shaft 23 must lift upwardly away from the annular shoulder 43 on the housing connector 14.

The mode of operation of the apparatus described is as follows:

When the magnet coil 28 of the electromagnet 25 is not excited, both the air valve 41 and the fuel valve 42 are closed, because the valve closing springs 32, 39 are designed accordingly. In the interior 24 of the cap part 15 communicating with the fuel connection 11, a fuel pressure of approximately 4 bar, in the case of intake tube injection, and approximately 8 bar in the case of direct injection into the engine cylinder, prevails. In the bore section 192 of larger diameter of the through bore 19 in the housing connector 14, that is, the section communicating with the air connection 12 via the radial bores 21 and the circumferential groove 22, an air pressure of approximately 1 to 3 bar prevails in the case of injection into the intake tube, and of approximately 7 bar with direct injection. The valve closing springs 32, 39 are dimensioned such that the spring force of the second valve closing spring 39 is greater than that of the first valve closing spring 32, but less than the sum of the spring force of the first valve closing spring 32 and the pressure force, acting upon the hollow shaft 23, of the fuel pressure prevailing in the interior 24 of the cap part 15. If this fuel pressure drops to zero, then counter to the restoring action of the first valve closing spring 32, the second valve closing spring 39 opens the air valve 41, while the fuel valve 42 remains closed.

If the magnet coil 28 of the electromagnet 25 is now excited, the armature 31 is attracted by the magnet cup 26 and cup core 27, and executes an upward stroke path h1, compressing the second valve closing spring 39 in the process. By means of the first valve closing spring 32, which via the closing head 37 of the valve needle 36 exerts a tensile force upon the hollow shaft 23, the hollow shaft 23, with its bearing shoulder 33, remains always in contact with the armature 31, and goes along with the stroke motion of the armature 31, as does the valve needle 36. As the stroke motion of the armature 31 begins, the annular shoulder 44 on the hollow shaft 23 lifts away from the annular shoulder 43 on the housing connector 14, and the air valve 41 is opened. Once the stroke path h2 has been covered, which is shorter than the maximum stroke path h2 of the armature 31, the face end of the valve needle 36 strikes the stop 40. This blocks the motion of the valve needle 36, and as the stroke of the armature 31 continues the annular shoulder 45 on the hollow shaft 23 lifts away from the annular shoulder 46 on the closing head 37 of the valve needle 36. Thus, the fuel valve 42 is opened as well. The fuel flowing out of the opened fuel valve 42 is atomized by the air flowing perpendicular to it out of the opened air valve 41 and is blown out from the blow-injection opening 20 with pressure. Depending on how the apparatus is installed in the engine, the fuel-air mixture either enters the intake tube or directly enters the cylinder of the engine.

Figure 2:
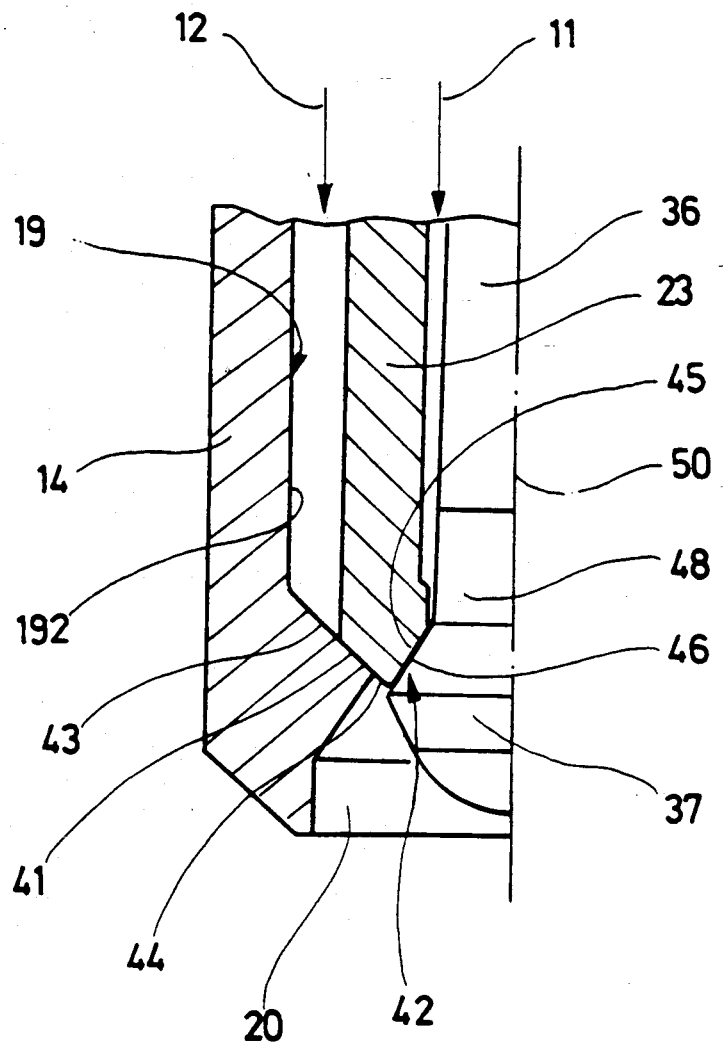
FIG. 2 is a partial enlarged view of the detail II of FIG. 1.

To prevent changes in length resulting from thermal expansion from affecting the critical metering air gap of the fuel valve 42, this valve is embodied as a throttle tang nozzle, with a throttle tang 48 located on the inside (see FIG. 2). The stroke of the valve needle 36 is long enough that the definitive throttle restriction is located between the valve needle 36 and the hollow shaft 23.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for a combined blow-injection of fuel and air for fuel injection systems of internal combustion engines, having a housing including a fuel connection (11), an air connection (12), and a flow-injection opening (20) communicating with said fuel connection and said air connection, an air valve (4), and a fuel valve (42) in said housing, each valve having a valve seat and a valve member disposed in the housing with said valves actuated by an electromagnet, said air valve is located in a communication between said air connection and said blow-injection opening and said fuel valve is located in a communication between said fuel connection and said blow-injection opening for a dosed metering of air and fuel, respectively, said air valve (41) and said fuel valve (42) are disposed concentrically to one another with their valve seats immediately at the blow-injection opening (20) and are embodied such that a valve member (36) of said fuel valve (42), including a valve seat (46) is spring-loaded in a closing direction and lifts outwardly to open the valve away from an associated valve seat (45), and a valve member (23) of said air valve (41) is spring-loaded in the closing direction and lifts inwardly away from an associated valve seat (43), said valve member of said air valve (23), is formed by a hollow shaft and includes said valve seat (45) of the fuel valve (42), said valve member of said air valve (23) is actuatable by an electromagnet (25) which opens said air valve (41) and said fuel valve (42); a stroke stop (40) is disposed in a stroke path of the hollow shaft valve member (23) and of the valve member (36) of the fuel valve (42) in such a manner that a maximum stroke path of the hollow shaft valve member (23) is longer than that of the valve member (36) of the fuel valve (42) so that both air and fuel valves (41,42) are opened.

2. An apparatus as defined by claim 1, which includes a hollow housing connector (14), said valve seat of the air valve (41) is embodied as an annular shoulder (43) on an inner wall of said hollow housing connector (14) juxtaposed said blow-injection opening (20), and the valve seat (46) of the fuel valve (42) is carried by said valve member (36) that penetrates the hollow shaft valve member (23) and is held in an axially displaceable manner.

3. An apparatus as defined by claim 2, in which said valve member (36) has a closing head (37) on a face end which has a diameter larger than a diameter of the valve member, and that the valve seat is embodied as a rearward annular shoulder on the closing head (37).

4. The apparatus as defined by claim 2, characterized in which the valve seat (44) disposed on the hollow shaft valve member (23) and the valve seat (45) for the fuel valve (42) disposed on the hollow shaft (23) are embodied as annular shoulders, inclined approximately at right angles to one another, on the outer and inner wall of the hollow shaft valve (23), and that said annular shoulder (43) on the inner wall of the housing connector (14) and the annular shoulder on the closing head (37), are inclined by approximately 45° relative to the housing axis (50).

5. The apparatus as defined by claim 3, characterized in which the valve seat (44) disposed on the hollow shaft valve member (23) and the valve seat (45) for the fuel valve (42) disposed on the hollow shaft (23) are embodied as annular shoulders, inclined approximately at right angles to one another, on the outer and inner wall of the hollow shaft valve (23), and that said annular shoulder (43) on the inner wall of the housing connector (14) and the annular shoulder on the closing head (37), are inclined by approximately 45° relative to the housing axis (50).

6. An apparatus as defined by claim 1, in which said electromagnet (25) has a magnet cup (26) with a cup core (27), magnet coil (28), and a movable armature (31); a first valve closing spring (32) for the air valve (41) is supported on the housing (10) and on the armature (31) and presses the armature against a stop shoulder (33) on the hollow shaft valve member (23), and that a second valve closing spring (39) for the fuel valve (42), having a force direction opposite the force direction of the valve closing spring (32) for the air valve (41), is supported on the housing (10) and on the valve member (36).

7. An apparatus as defined by claim 2, in which said electromagnet (25) has a magnet cup (26) with a cup core (27), magnet coil (28), and a movable armature (31); a first valve closing spring (32) for the air valve (41) is supported on the housing (10) and on the armature (31) and presses the armature against a stop shoulder (33) on the hollow shaft valve member (23), and that a second valve closing spring (39) for the fuel valve (42), having a force direction opposite the force direction of the valve closing spring (32) for the air valve (41), is supported on the housing (10) and on the valve member (36).

8. An apparatus as defined by claim 3, in which said electromagnet (25) has a magnet cup (26) with a cup core (27), magnet coil (28), and a movable armature (31); a first valve closing spring (32) for the air valve (41) is supported on the housing (10) and on the armature (31) and presses the armature against a stop shoulder (33) on the hollow shaft valve member (23), and that a second valve closing spring (39) for the fuel valve (42), having a force direction opposite the force direction of the valve closing spring (32) for the air valve (41), is supported on the housing (10) and on the valve member (36).

9. An apparatus as defined by claim 4, in which said electromagnet (25) has a magnet cup (26) with a cup core (27), magnet coil (28), and a movable armature (31); a first valve closing spring (32) for the air valve (41) is supported on the housing (10) and on the armature (31) and presses the armature against a stop shoulder (33) on the hollow shaft valve member (23), and that a second valve closing spring (39) for the fuel valve (42), having a force direction opposite the force direction of the valve closing spring (32) for the air valve (41), is supported on the housing (10) and on the valve member (36).

10. An apparatus as defined by claim 5, in which said electromagnet (25) has a magnet cup (26) with a cup core (27), magnet coil (28), and a movable armature (31); a first valve closing spring (32) for the air valve (41) is supported on the housing (10) and on the armature (31) and presses the armature against a stop shoulder (33) on the hollow shaft valve member (23), and that a second valve closing spring (39) for the fuel valve (42), having a force direction opposite the force direction of the valve closing spring (32) for the air valve (41), is supported on the housing (10) and on the valve member (36).

11. An apparatus as defined by claim 6, in which the hollow shaft valve member (23) protrudes into a fuel-filled chamber (24) disposed downstream of the fuel connection (11) and includes at least one inflow bore (47) that discharges into the hollow shaft valve member interior, and that spring forces of said first and second valve closing spring (32, 39) are adjusted such that the spring force of the second valve closing spring (39) for the fuel valve (42) is greater than the spring force of the first valve closing spring (32) for the air valve (41) but less than the sum of the spring force of the first valve closing spring (32) for the air valve (41) and the pressure force, acting upon the hollow shaft valve member (23), of the fuel pressure prevailing in the fuel-filled chamber (24).

12. An apparatus as defined by claim 7, in which the hollow shaft valve member (23) protrudes into a fuel-filled chamber (24) disposed downstream of the fuel connection (11) and includes at least one inflow bore (47) that discharges into the hollow shaft valve member interior, and that spring forces of said first and second valve closing spring (32, 39) are adjusted such that the spring force of the second valve closing spring (39) for the fuel valve (42) is greater than the spring force of the first valve closing spring (32) for the air valve (41) but less than the sum of the spring force of the first valve closing spring (32) for the air valve (41) and the pressure force, acting upon the hollow shaft valve member (23), of the fuel pressure prevailing in the fuel-filled chamber (24).

13. An apparatus as defined by claim 8, in which the hollow shaft valve member (23) protrudes into a fuel-filled chamber (24) disposed downstream of the fuel connection (11) and includes at least one inflow bore (47) that discharges into the hollow shaft valve member interior, and that spring forces of said first and second valve closing spring (32, 39) are adjusted such that the spring force of the second valve closing spring (39) for the fuel valve (42) is greater than the spring force of the first valve closing spring (32) for the air valve (41) but less than the sum of the spring force of the first valve closing spring (32) for the air valve (41) and the pressure force, acting upon the hollow shaft valve member (23), of the fuel pressure prevailing in the fuel-filled chamber (24).

14. An apparatus as defined by claim 9, in which the hollow shaft valve member (23) protrudes into a fuel-filled chamber (24) disposed downstream of the fuel connection (11) and includes at least one inflow bore (47) that discharges into the hollow shaft valve member interior, and that spring forces of said first and second valve closing spring (32, 39) are adjsuted such that the spring force of the second valve closing spring (39) for the fuel valve (42) is greater than the spring force of the first valve closing spring (32) for the air valve (41) but less than the sum of the spring force of the first valve closing spring (32) for the air valve (41) and the pressure force, acting upon the hollow shaft valve member (23), of the fuel pressure prevailing in the fuel-filled chamber (24).

15. An apparatus as defined by claim 10, in which the hollow shaft valve member (23) protrudes into a fuel-filled chamber (24) disposed downstream of the fuel connection (11) and includes at least one inflow bore (47) that discharges into the hollow shaft valve member interior, and that spring forces of said first and second valve closing spring (32, 39) are adjusted such that the spring force of the second valve closing spring (39) for the fuel valve (42) is greater than the spring force of the first valve closing spring (32) for the air valve (41) but less than the sum of the spring force of the first valve closing spring (32) for the air valve (41) and the pressure force, acting upon the hollow shaft valve member (23), of the fuel pressure prevailing in the fuel-filled chamber (24).

16. An apparatus as defined by claim 11, in which said valve member (36) includes a large diameter up end guide section (361) which is axially displaceable in said hollow shaft valve member, the guide section is upstream of said inflow bore 47 that penetrates the hollow shaft wall, said valve member (36) includes an end portion that protrudes beyond the guide section, and includes a retaining spring plate (38) for supporting the valve closing spring (39) and for retaining the fuel valve (42) in place.

17. An apparatus as defined by claim 2, in which said housing connector (14) is inserted in an air-tight manner into the housing (10), and an interior (192) of said housing connector (14) communicates with the air connection (12) via at least one radial bore (21) in said housing connector (14).

18. An apparatus as defined by claim 11, in which fuel pressure in the fuel-filled chamber (24) communicates with the fuel connection (11) and is kept constant during engine operation, at approximately 4 bar in the case for intake tube injection and approximately 8 bar for direct injection into the engine cylinders, and that the air pressure present at the air connection (12) is approximately constant and is at a lower pressure than the fuel prsssure and is preferably approximately 1 to 3 bar for intake tube injection and approximately 7 bar for direct injection into the engine cylinders.

19. An apparatus as defined by claim 16, in which fuel pressure in the fuel-filled chamber (24) communicates with the fuel connection (11) and is kept constant during engine operation, at approximately 4 bar in the case for intake tube injection and approximately 8 bar for direct injection into the engine cylinders, and that the air pressure present at the air connection (12) is approximately constant and is at a lower pressure than the fuel pressure and is preferably approximately 1 to 3 bar for intake tube injection and approximately 7 bar for direct injection into the engine cylinders.

20. An apparatus as defined by claim 17, in which fuel pressure in the fuel-filled chamber (24) communicates with the fuel connection (11) and is kept constant during engine operation, at approximately 4 bar in the case for intake tube injection and approximately 8 bar for direct injection into the engine cylinders, and that the air pressure present at the air connection (12) is approximately constant and is at a lower pressure than the fuel pressure and is preferably approximately 1 to 3 bar for intake tube injection and approximately 7 bar for direct injection into the engine cylinders.

21. The apparatus as defined by claim 1, in which said fuel valve (42) is embodied as a throttle tang nozzle with an externally located throttle tang (48).

* * * * *